(12) United States Patent
Han

(10) Patent No.: US 8,563,900 B2
(45) Date of Patent: Oct. 22, 2013

(54) CHARCOAL SMOKE-FAR INFRARED RAY RADIATING OVEN

(76) Inventor: Dae-Hee Han, Gwangju-si (KR)

( * ) Notice: Subject to any disclaimer, the term of this patent is extended or adjusted under 35 U.S.C. 154(b) by 638 days.

(21) Appl. No.: 12/499,409

(22) Filed: Jul. 8, 2009

(65) Prior Publication Data

US 2010/0028502 A1    Feb. 4, 2010

(30) Foreign Application Priority Data

Aug. 4, 2008  (KR) .......................... 10-2008-0076008

(51) Int. Cl.
*A21B 1/22*        (2006.01)
*A23B 4/056*     (2006.01)

(52) U.S. Cl.
USPC ........... 219/411; 219/391; 219/400; 219/405; 219/406; 219/408; 219/410; 392/416; 392/418; 99/44; 99/446; 99/451; 99/482; 99/448; 426/235; 426/315

(58) Field of Classification Search
USPC ............. 219/391, 411, 400, 405–6, 408, 410; 392/416, 418; 99/444, 446, 451, 482, 99/448, 421 H; 426/235, 315
See application file for complete search history.

(56) References Cited

U.S. PATENT DOCUMENTS

| 4,803,324 | A | | 2/1989 | Fujii et al. |
| 5,560,285 | A | * | 10/1996 | Moreth ...................... 99/421 H |
| 6,297,485 | B1 | | 10/2001 | Kim et al. |
| 7,257,987 | B2 | | 8/2007 | O'Brien et al. |

FOREIGN PATENT DOCUMENTS

| JP | 6452397 | | 2/1989 |
| JP | 30-13731 | * | 1/1991 |
| JP | 3013731 | | 1/1991 |
| JP | 2004132609 | | 4/2004 |
| WO | WO 89/11773 | | 11/1989 |

* cited by examiner

*Primary Examiner* — Shawntina Fuqua

(74) *Attorney, Agent, or Firm* — King & Schicki, PLLC

(57) ABSTRACT

An oven body includes a grilling chamber provided with several far infrared ray heaters and a smoking chamber that emits smoke from the charcoal heated by electric heaters, wherein the meat to be roasted is rotated in the grilling chamber by a rotating means, rotating alternately through a far infrared ray heating area where far infrared ray concentrates and through a smoking area where smoke concentrates, in which process the roasting operation by the far infrared ray and the smoking operation with particular scent of a charcoal are carried out simultaneously.

10 Claims, 5 Drawing Sheets

CHARCOAL SMOKE-FAR INFRARED RAY RADIATING OVEN

TECHNICAL FIELD

The present invention relates to a charcoal smoke-far infrared ray radiating oven including a far infrared ray radiating grilling chamber and a charcoal smoke emitting smoking chamber that can roast and smoke meat simultaneously.

BACKGROUND OF THE INVENTION

Ovens in general used in households are provided with at least one of an electric heater, a high frequency heater and a far infrared ray heater to heat or cook food of various kinds.

There have been conventional ovens of various types for business use for grilling or roasting meats of various kinds in large quantities. We can roughly divide these ovens in two distinctive types—an oven for grilling by burning organic fuel and an oven for grilling by electric heat.

For example, in the case of an oven in which wood or other kinds of fuel is used, a rotating member for rotating the meat to be roasted is mounted in the central portion within the grilling chamber in the oven body, and by burning, for example, pine wood blocks on a rooster mounted on the lower portion of the grilling chamber, the meat on the rotating member is roasted and smoked as it rotates while the soot-containing smoke from the wood is discharged through an air exhauster provided at the top of the oven body.

In the case of an oven in which electric heat is used, a plurality of electric heaters and a rotating member for roasting meat are mounted inside an oven. The meat is roasted by the electric heat emitted from the electric heater while the meat is rotated on the rotating member.

SUMMARY OF THE INVENTION

The conventional oven in which the meat is grilled or roasted by burning organic fuel such as wood can not utilize the burning heat to a satisfactory level. And of late, waste wood has been used to reduce the cost of fuel. This causes harmful and toxic materials including heavy metals contained in the waste wood to be thermally decomposed and infiltrate into the meat. Moreover, the fat dissolved from the meat falls onto the grates and is reheated and redissolved by the wood burning heat. This leads to a complex thermal chemical action with other burning gases generating harmful gases and dioxin from incomplete burning, causing the meat to contain dioxin, a known hazardous material.

In the case of the conventional oven in which meat is grilled or roasted by an electric heater by the rotation of the meat-carrying rotating member in the grilling chamber of the oven, as the heating is done by radiant heat, heat is not transmitted satisfactorily into the interior of the meat, prolonging the time for roasting and making it difficult to roast the meat in large quantities. Moreover, as the meat cannot be smoked in the oven, the meat grilled in the oven had to be transferred to a separate smoking device, necessitating a larger space for these two facilities, resulting in longer time and higher cost for operating the oven.

To address this problem, in one aspect the present invention provides a charcoal smoke-far infrared ray radiating oven in which the oven body has a grilling chamber provided with far infrared ray heaters and a charcoal smoking chamber in which while the meat is rotated by an ordinary rotating means in the grilling chamber, the meat is roasted swiftly by far infrared rays and is charcoal smoked as well simultaneously, thereby producing charcoal-smoked roast meat.

In another aspect, the present invention provides a charcoal smoke-far infrared ray radiating oven as described above in which a combination of a fat-removing means, an air-circulating means and a ventilator are provided so that the meat is roasted equally in all parts by uniformly maintaining equal temperatures by convective heat as well as by hygienic environment of the grilling chamber, preventing the generation of dioxin caused by incomplete burning of the flammable materials so as to produce hygienic and tasty roast meat of various kinds.

Yet another aspect of the present invention provides a charcoal smoke-far infrared ray radiating oven that can be used easily by any unskilled person with its simple, trouble-free structure, and with ease in operating the oven.

To address the need in the art identified above, a convection oven is provided in which meat is roasted in a relatively short time by rotating the meat in the grilling chamber provided with a heating means, comprising, inside the oven body, a grilling chamber provided with far infrared ray heaters and a smoking chamber generating smoke by heating charcoal or other organic fuel, the grilling chamber and the smoking chamber being arranged above and below each other.

The grilling chamber occupies a significant portion of the oven body, with an increased number of heaters provided on the rear wall compared to the top wall or ceiling. In one embodiment, far infrared ray heaters are provided at a ratio of 2:1 respectively on the rear wall and on the ceiling in the grilling chamber. The reason why there are more far infrared ray heaters on the rear wall than on the ceiling is that hot air concentrates in the upper space in the grilling chamber.

Each of the far infrared ray heaters mounted on the rear wall and on the ceiling has a heating wire inside a ceramic tube body, and if the heating wire is heated, far infrared rays are emitted from the ceramic tube body. The skilled artisan will appreciate that by the term "far infrared ray" it is meant an invisible light ray having a wavelength longer than 25 μm, longer than a visible ray. Because a far infrared ray has an excellent ability to generate heat and to infiltrate, it is used commonly for heating means in heaters.

In an embodiment of the present invention, the overall consumption of electricity of the far infrared ray heaters in the oven was about 6 kw/h and the heaters generated heat of from about 230° C. to about 250° C.

The smoking chamber is physically partitioned from the grilling chamber, typically by a bottom plate with sloping plates on both sides provided at the bottom portion of the grilling chamber of the oven. The sloping plate on the left hand corner is provided with a number of smoking holes. A plurality of electric heaters are arranged side by side in the form of grates for a charcoal or other organic fuel to be placed thereon. The charcoal burns as they are heated by the electric heaters, and give off smoke having far infrared rays and a particular scent of a charcoal. The charcoal smoke thus generated enters the grilling chamber through the smoking holes in the sloping plate.

The means to rotate the meat to be roasted is provided in an interior of the grilling chamber of the oven by fixing a pair of round rotating plates on both end portions of a shaft that revolves by a driving means. Roasting baskets carrying chicken or other meats are hung on several extrusions provided on the rotating plates so that when the shaft revolves by a driving means, the rotating plates rotate and the meat-carrying roasting baskets rotate up and down to be grilled and roasted. It is known to provide such rotating means in this art field.

The roasting baskets that carry chicken or other kind of meat are made to rotate by the rotating means at a predetermined speed, in one embodiment from about 5 to about 10 times a minute, and when power is supplied to the far infrared ray heaters and the electric heaters for the charcoal, far infrared rays are emitted from the far infrared ray heaters and the charcoal is heated and burns giving off charcoal smoke into the grilling chamber. As the meat to be roasted passes alternately through the far infrared ray heating area on which far infrared ray concentrates and the smoking area in which charcoal smoke concentrates, the far infrared ray with a wavelength longer than 25 μm infiltrates deep into the fleshy substance of the meat, and strong resonance operations of over 2000 times a minute are repeated. Moreover, by this resonance that leads to the disruption of water molecule clusters contained in the meat, the texture of the fleshy substance becomes soft, and the meat is roasted quickly from inside the fleshy substance by the heat of the far infrared ray.

Meanwhile, in the process of the meat passing the smoking area, the far infrared ray and the particular scent of the charcoal smoke infiltrate into the fleshy substance of the meat, and as the texture of the fleshy substance is already made soft, the charcoal smoke can easily infiltrate deep into the fleshy substance, adding to the taste with the unique scent of the charcoal.

To help understand the invention easily, explanation is given distinguishing between the far infrared heating area and the smoking area, however, though far infrared ray heating area has greater concentration of far infrared ray and the smoking area has greater concentration of charcoal smoke, both the far infrared ray and the charcoal smoke till the grilling chamber. Therefore, chicken or other kinds of meat is roasted and smoked simultaneously in the grilling chamber of the oven. Because the roasting of the meat and the smoking of the meat by the charcoal smoke are done simultaneously, a large quantity of meat can be roasted and smoked for good taste of the meat more efficiently.

The present invention may further include a combination of a fat-removing means, an air circulating means, and a ventilator. The fat-removing means is provided with holes in the central portion of the bottom plate in the form of a hopper with sloping plates on both sides that partitions between the grilling chamber and the smoking chamber. The fat in the form of a liquid separated by heating the meat is discharged through said holes into the fat-receiving tray.

As the bottom of the grilling chamber may be made of a heat-reflective substance such as stainless steel. Because the grilling chamber bottom is defined by a plate that is sloped and reflects heat, the heat from the grilling chamber does not reach the lower space where the fat-receiving dish is located. Therefore, the fat collected in the fat-receiving dish does not burn, nor does it cause soot by burning, nor is there any likelihood of causing generation of dioxin from incomplete burning of any material.

An air-circulating means is provided with an air-supply blower that supplies fresh air from the outside into the space of the grilling chamber of the oven and an air-circulating blower that convects the heated air in the grilling chamber and maintains equal distribution of the temperature in the grilling chamber, both said blowers being provided via a tube in communication with the outside. A ventilator is provided near the air-supply blower for the soot-containing smoke to be discharged.

The air-circulating means enables fresh air to be supplied from the outside into the grilling chamber. At the same time, soot and other gaseous material containing vaporized oil contents floating in the grilling chamber are discharged to the outside through the ventilator, thereby maintaining clean environment within the space of the grilling chamber. Moreover, by the convection of the heated air, the temperature inside the grilling chamber is nearly equally distributed and maintained in that condition so that the meat carried in the several roasting baskets is roasted uniformly and simultaneously. Further, a clean environment as well as equal temperature distribution is made possible in the grilling chamber of the oven.

Advantageously, by combining the above features with the described oven including a far infrared cooking area and a smoking area, a synergetic effect is achieved. In particular, the lack of generation of dioxin allows roasting of the meat in large quantities quickly in a hygienic environment, improving the function of convection oven considerably.

According to the convection oven of the present invention, chicken and other kinds of meat can be processed in large quantities in 10 to 15 minutes at a temperature between 230° C. and 250° C. without creating dioxin, a known health hazard, while preserving flavor of the meat ensured in a sanitary environment. Further, quick roasting of the meat by far infrared rays and the smoking with particular scent of the charcoal are done simultaneously to produce a roasted and smoked meat. Still further, the charcoal or other organic fuel held in the smoking chamber is heated and burned by electric heaters, therefore, the user is spared the trouble of lighting the charcoal and can continue the charcoal smoking conveniently. In addition, with the combination of the fat-removing means, the air-circulating means and the ventilator, equal temperature distribution is maintained in a clean grilling chamber, and meat in large quantities can be roasted simultaneously and in a sanitary environment. Because the presently described oven has a simple structure and little likelihood of mechanical failure, even an unskilled person can use the oven conveniently to produce tasty meat in large quantities in a hygienic condition.

DETAILED DESCRIPTION OF THE INVENTION

An embodiment of the present invention is described in detail as follows by the drawings attached.

Figure 1:
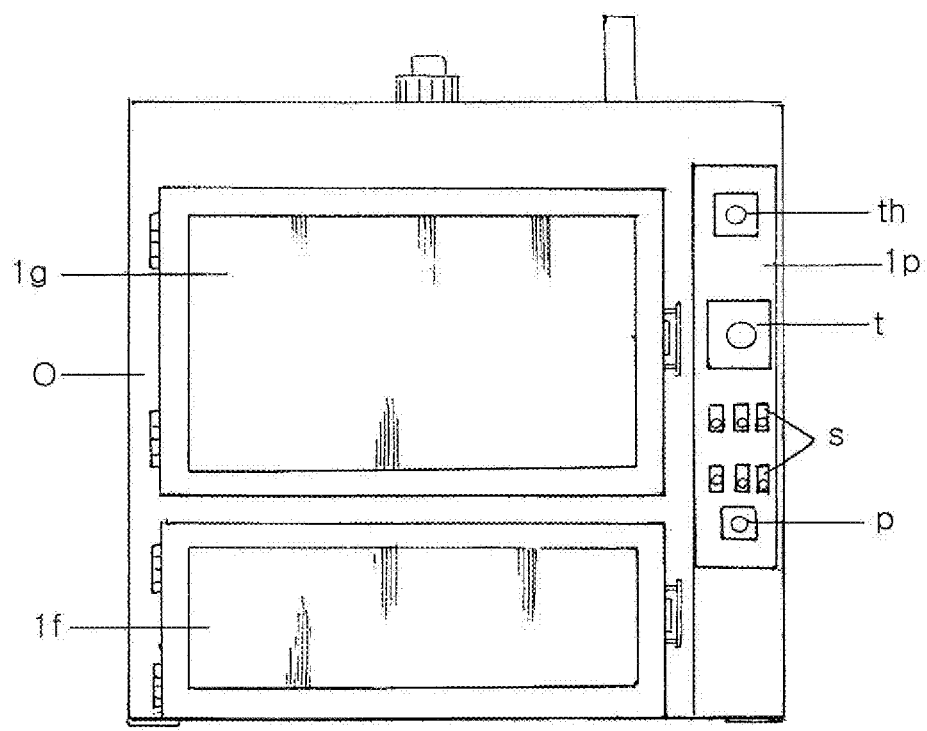
FIG. 1 is a front view of the oven of the present invention showing an embodiment of the invention.
Figure 2:
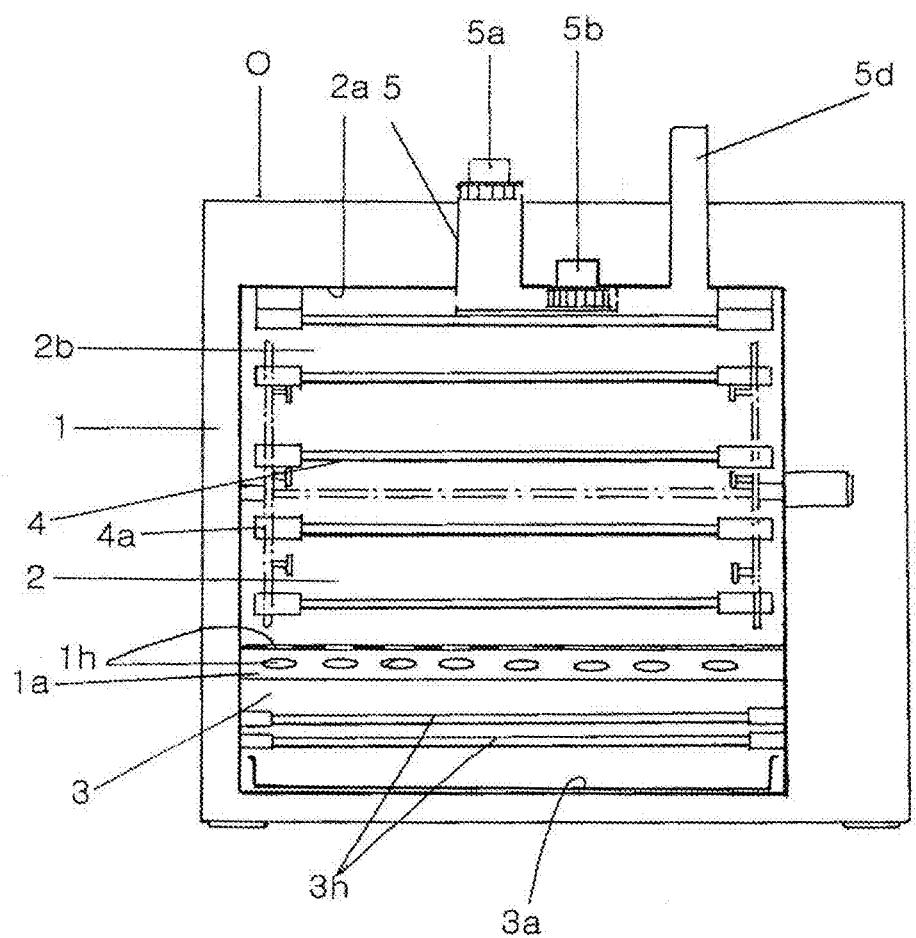
FIG. 2 is a front view of the oven of the present invention showing the grilling chamber and the smoking chamber without their doors.
Figure 3:
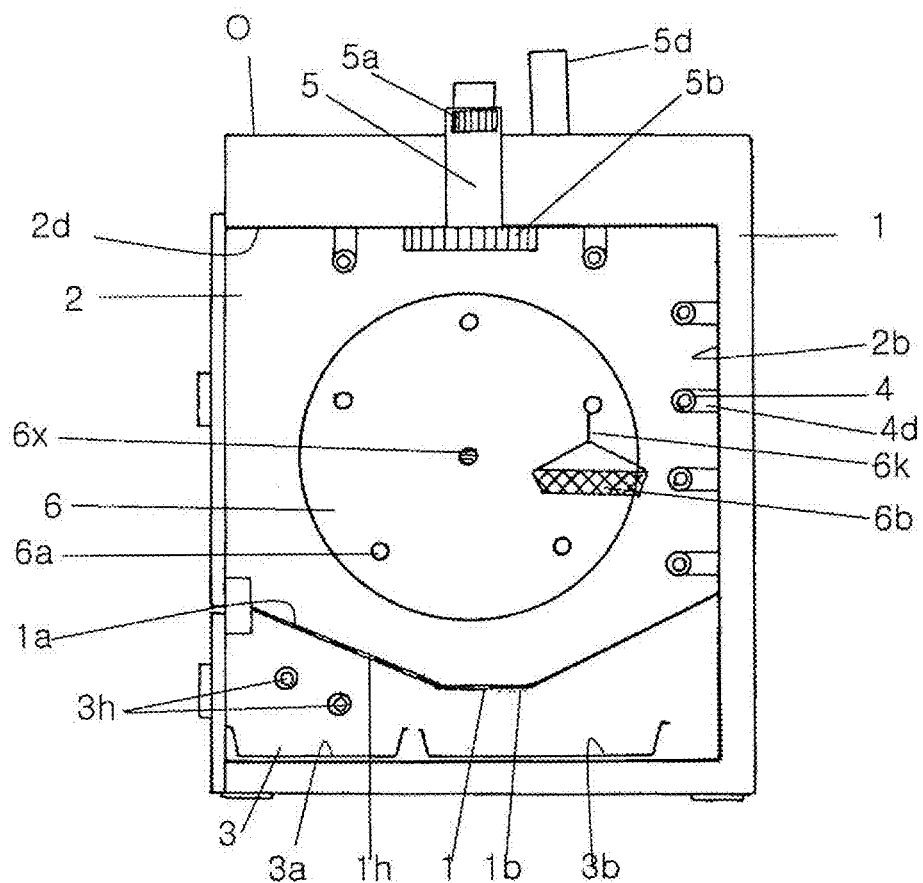
FIG. 3 is a sectional view of the oven of the present invention.

FIG. 1 is a front view of the oven of the present invention showing its external appearance, FIG. 2 is a front view of the oven of the present invention showing its grilling chamber and smoking chamber, and FIG. 3 is a sectional view of the oven of the present invention showing its grilling chamber and smoking chamber.

As shown in FIG. 2 and FIG. 3, the body (1) of the oven (O) has a grilling chamber (2), which occupies a great part of the space of the oven, and a smoking chamber (3) occupying a smaller space physically partitioned from the grilling chamber (2).

Several far infrared ray heaters (4) are mounted at regular intervals on the rear wall (2b) and on the ceiling (2a) in the grilling chamber (2) via supporting sockets (4a). In the depicted embodiment, two far infrared ray heaters (4) are mounted on the ceiling of the grilling chamber (2), and four far infrared ray heaters (4) are mounted on the rear wall of the grilling chamber (2). However, the number of the far infrared ray heaters (4) is not restricted to the number shown in the drawings. In one embodiment, far infrared ray heaters (4) are provided at a ratio of 2:1 respectively on the rear wall and on the ceiling in the grilling chamber (2), since hot air concentrates in the upper space in the grilling chamber (2) and accordingly fewer heaters (4) are required to maintain a desired cooking temperature. The total consumption of electricity of the far infrared ray heaters (4) in the depicted embodiment is 6 kw/h producing a temperature of 230° C.~250° C.

The far infrared rays emitted from the far infrared ray heaters (4) are emitted into the grilling chamber (2), and the far infrared rays reflected by the surrounding walls are distributed in the space of the grilling chamber (2). For convenience of explanation, the space where the far infrared rays are concentrated near the position of the far infrared ray heaters is designated far infrared ray heating area (A).

The grilling chamber (2) and the smoking chamber (3) are partitioned by a bottom plate (1b) defining sloping plates (1a) on both sides. In a corner portion of the smoking chamber (3), there are a plurality of electric heaters (3h) mounted laterally side by side at different heights in the form of grates. A charcoal or other suitable organic fuel (C) for smoking is placed on the electric heaters (3h) in a tilted orientation, and an ash tray (3a) is placed on the floor of the smoking chamber (3). A number of smoking holes (1h) are provided in a sloping plate (1a) of the bottom plate (1b) partitioning between the grilling chamber (2) and the smoking chamber (3) (see FIG. 2). The far infrared ray and smoke caused by heating by the electric heaters (3h) and by the burning of the charcoal (C) enter the grilling chamber (2) through the smoking holes (1h) in the sloping plate (1a) and spread in the grilling chamber (2). For convenience sake, the space of the grilling chamber where smoke is concentrated near the smoking chamber is designated smoking area B.

In the central portion of the bottom plate (1b) at the lower bottom portion of the grilling chamber (2), there are fat discharge holes (1u) (see FIG. 5), through which the fat in a liquid form discharging from the fleshy substance of the meat by heat falls into the fat receiving tray (3b).

An air-supply blower (5a) is provided at the top portion of the grilling chamber (2) of the oven (O) to supply fresh air from outside of the oven and maintain the space in: the grilling chamber in a clean environment. An air-circulating blower (5b) (see FIG. 2) is also provided at the top portion of the grilling chamber (2) to convect the heated air in the grilling chamber so as to maintain equal distribution of temperature in the grilling chamber (2). The two blowers (5a, 5b) are provided with a tube body (5) in such a way as to communicate between the inside of the grilling chamber and the outside of the oven, shown by arrows in FIG. 4. A soot discharging ventilator (5d) is provided near the air supply blower (5a) vertically for communication with the grilling chamber so that the soot from the inside of the grilling chamber may be discharged to the outside through the ventilator (5d) according to the increase in the interior pressure in proportion to the amount of the air supplied to the grilling chamber from the outside.

As a known meat rotating means a pair of round rotating plates (6) are provided with a laterally installed shaft (6x) in the central portion of the grilling chamber (2), and the rotating plates rotate by a driving motor (6m) connected at one end portion of the shaft (6x). Several extrusions (6a) are provided on the interior surface of each of the rotating plates near its circumferential edge, and the hook (6k) of each of the roasting baskets (6b) carrying meat (m) is hooked on each of these extrusions on the rotating plates (6). The roasting baskets maintain their suspended state by their weight and rotate up and down, left and right within the space of the grilling chamber (2). Of course, the skilled artisan will readily recognize that any suitable rotating means or rotisserie which may or may not include one or more of these features may be adapted for inclusion in the oven of the present invention without undue experimentation, and use thereof is contemplated herein. Unexplained numerals in the drawings are as follows: 1c is an entrance/exit to and from the grilling chamber; 1d is an entrance/exit to and from the smoking chamber; 1g is a door of the grilling chamber; 1f is a door of the smoking chamber; 1p is an electronic control plate; th is a temperature controller; t is a timer; s is a power switch for each of the heaters; p is a pilot lamp.

Figure 4:
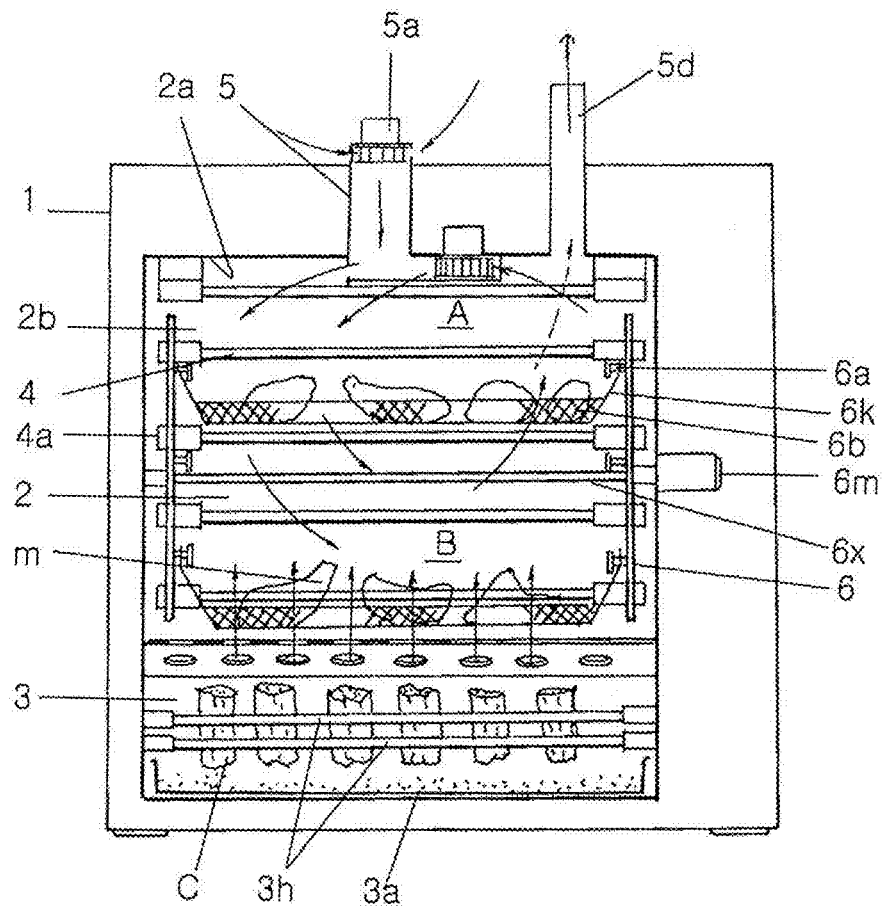
FIG. 4 is a front view of the oven of the present invention in use.
Figure 5:
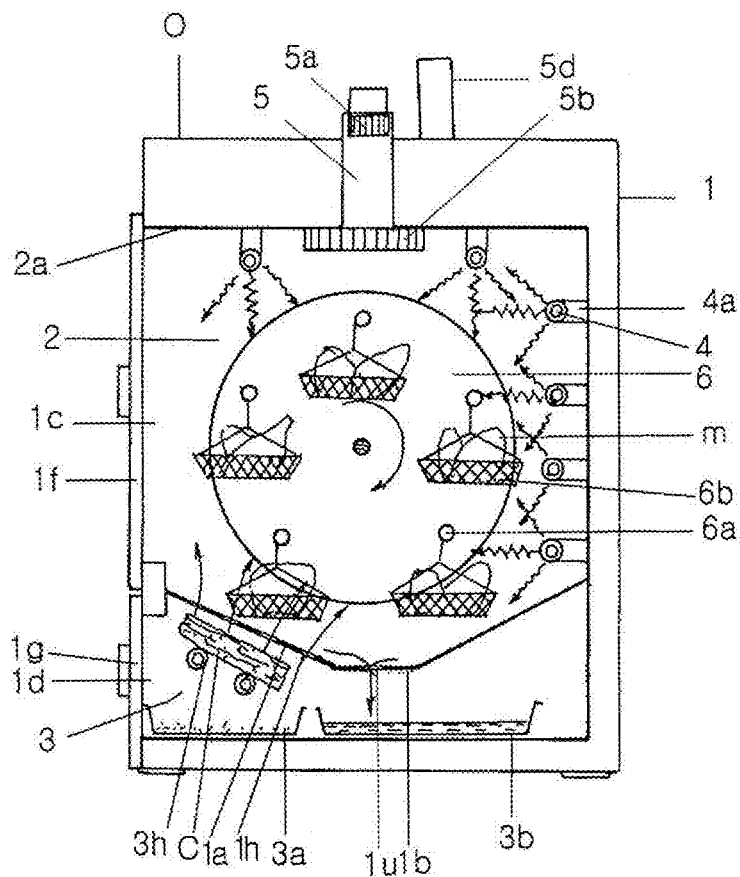
FIG. 5 is a side sectional view of the oven of the present invention.

In an embodiment of the oven of the present invention, as shown in FIG. 4 and FIG. 5, a charcoal or other suitable organic fuel (C) is placed on the electric heaters (3h) in the smoking chamber (3), and meat is placed in each of the roasting baskets (6b) which are hung on the extrusions (6a) on the rotating plates (6) via a hook (6k). A desired temperature is set using temperature controller th and a predetermined time of cooking is set using the timer t, and then the power switch s is turned on to supply power to the far infrared ray heaters (4), electric heaters (3h) and the driving motor (6m). With power supplied, far infrared rays are emitted from the heated far infrared ray heaters (4) in the grilling chamber (2), and in the smoking chamber, the charcoal is heated and burned by the electric heaters (3h). In this process, the burned materials drop into the ash tray (3a), and the far infrared rays and smoke generated by the charcoal are emitted into the grilling chamber (2) through the smoking holes (1h) provided in the sloping plate (1a). As a result, the space in the grilling chamber (2) may be partitioned into a far infrared heating area (A) where far infrared rays concentrate and a smoking area (B) where smoke concentrates.

Meanwhile, the rotating plates (6) rotate with the revolving of the shaft (6x) driven by the driving motor (6m), and the meat (m) placed in the roasting baskets (6b) hung on the rotating plates (6) rotate alternately and continuously through the far infrared ray, heating area (A) and the smoking area (B). As the rotating roasting baskets pass through these two areas (A, B), far infrared rays infiltrate into the fleshy substance of the meat, and by the physical action of the far infrared ray, the fleshy substance is heated and roasted from the interior. At the same time, the smoke having a unique scent of a charcoal infiltrates deep into the fleshy substance being heated, and the process of both roasting and smoking the meat is carried on.

Fresh air is supplied from outside into the grilling chamber (2) by the air-supply blower (5a), and soot is discharged from the grilling chamber through the ventilator (5d) thereby maintaining clean environment in the grilling chamber. Heated air convects by the air-circulating blower (5b) and the temperature distribution is substantially equally maintained in the grilling chamber. Therefore, with the passage of 10~15 minutes, roasted meat, hygienic, tasty and free from health-hazardous dioxin is produced.

What is claimed is:

1. A charcoal smoke-far infrared ray radiating convection oven in which meat to be roasted is heated and roasted while being rotated by rotating plates, comprising:

a. a sealable grilling chamber provided with a plurality of far infrared ray heaters emitting far infrared rays for roasting meat in a heating area of said grilling chamber;

b. a smoking chamber partitioned from and disposed below the grilling chamber, said smoking chamber being provided with a plurality of electric heaters which generate far infrared rays and smoke from an organic fuel placed on said electric heaters, said smoke being discharged into a smoking area of the grilling chamber; and c. an air circulating means including at least one air-circulating blower in fluid communication with an air supply blower that supplies air from an exterior of the grilling chamber, for convecting heated air and maintaining an equal distribution of temperature in the grilling chamber;

whereby the roasting by the far infrared rays and the smoking from the organic fuel are carried out simultaneously in the convection oven by rotating said meat sequentially through said heating area and said smoking area to produce a smoked and roasted meat.

2. The convection oven of claim 1, wherein the grilling chamber is provided with said plurality of far infrared ray heaters mounted at regular intervals on a ceiling and on a rear wall via supporting sockets in an interior of the grilling chamber.

3. The convection oven of claim 1, wherein the smoking chamber is partitioned from the grilling chamber by a heat-reflective bottom plate defining sloping sides; further wherein the bottom plate includes a plurality of smoking holes for discharging smoke from the smoking chamber into the grilling chamber.

4. The convection oven of claim 3, further including a plurality of electric heaters arrayed in the smoking chamber for supporting and heating the organic fuel to create smoke.

5. The convection oven of claim 3, further including fat-removing means comprising with fat discharge holes in a central portion of the bottom plate at the bottom of the grilling chamber, through which fat separating from the meat during cooking is discharged into a fat receiving tray disposed under the bottom plate.

6. The convection oven of claim 1, further including a ventilator for discharging smoke and soot from the interior of the oven.

7. The convection oven of claim 1, wherein said air supply blower is mounted at a top portion of the oven body.

8. The convection oven of claim 7, wherein the air circulating blower is mounted at a top portion of the grilling chamber and the air supply blower and air circulating blower are placed in fluid communication via a tube.

9. The convection oven of claim 1, wherein the smoking chamber is disposed below the grilling chamber.

10. The convection oven of claim 2, wherein the plurality of grilling chamber far infrared ray heaters are mounted at a ratio of 2:1 respectively on the rear wall and the ceiling of the grilling chamber.

* * * * *